United States Patent
Klausner

(10) Patent No.: US 6,859,695 B2
(45) Date of Patent: Feb. 22, 2005

(54) METHOD AND DEVICE FOR INTERPRETING EVENTS AND OUTPUTTING OPERATING INSTRUCTIONS IN MOTOR VEHICLES

(75) Inventor: Markus Klausner, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/204,115

(22) PCT Filed: Feb. 16, 2001

(86) PCT No.: PCT/DE01/00612

§ 371 (c)(1),
(2), (4) Date: Nov. 27, 2002

(87) PCT Pub. No.: WO01/60661

PCT Pub. Date: Aug. 23, 2001

(65) Prior Publication Data

US 2003/0144775 A1 Jul. 31, 2003

(30) Foreign Application Priority Data

Feb. 17, 2000 (DE) .......................... 100 07 218

(51) Int. Cl.⁷ ................................. G06F 7/00
(52) U.S. Cl. ............................ 701/29; 701/35; 701/36; 340/438; 340/439
(58) Field of Search ................ 701/29, 33, 34, 701/35, 36; 340/438, 439

(56) References Cited

U.S. PATENT DOCUMENTS 4,271,402 A    6/1981  Kastura et al.
6,289,332 B2 * 9/2001  Menig et al. ................ 707/1
2002/0010542 A1 * 1/2002  Ahrens et al.

FOREIGN PATENT DOCUMENTS

EP    0 903 264    3/1999
EP    0 949 122    10/1999
WO    WO 98 51534  11/1998

OTHER PUBLICATIONS

German Engineering Society Reports, No. 687, 1988 cited in specification.

* cited by examiner

Primary Examiner—Gertrude A. Jeanglaude
(74) Attorney, Agent, or Firm—Kenyon & Kenyon

(57) ABSTRACT

A method and a device for event interpretation and output of operating instructions in motor vehicles are described. The inventive idea is to bundle the wealth of information regarding errors and/or defects resulting from the multitude of sensors and the complexity of modern vehicles, optionally linking it with empirical findings and outputting operating instructions to the driver, so that the instructions do not make excessive technical demands of the driver but instead are adapted to his/her instantaneous situation. The core of the inventive concept is to use an electronic database which contains the technical information including the error codes of devices of the automotive sensor and electronic systems for analysis of event information which informs the driver comprehensively and yet comprehensibly regarding the problems that have occurred. Likewise the database may be the target of an inquiry initiated by the driver.

11 Claims, 3 Drawing Sheets

FIG 2

| Error code | Error text | Type of error | Audio | Visual display | Consequence | Classification | Recommendation (What to do?) | Display delay (When to inform the driver?) |
|---|---|---|---|---|---|---|---|---|
| 0480 | Cooling fan, 1st control circuit | Malfunction | <<Audio 0480>> | <<visual display 0480>> | Risk of engine overload | Serious problem | Low engine load, stop if temp. rises further, take vehicle to repair shop immediately | None, notify immediately |
| 4711 | ... | ... | ... | ... | | Mild problem | Take vehicle to a repair shop within the next 2000 km | Before starting the vehicle the next time |
| | | | | | | | | |
| | | | | | | | | |
| | | | | | | | | |

FIG 3

| Event | Consequence | Recommendation to Driver |
|---|---|---|
| Coolant temperature > 110 AND Coolant level = "too low" | Risk of engine overheating | Stop at next opportunity and add more coolant |
| Coolant temperature > 110 rpm > 7000 AND engine load - "high" AND observation time > 2 sec | Reduced engine lifetime | Reduce engine speed and load immediately |
| ... | ... | ... |

METHOD AND DEVICE FOR INTERPRETING EVENTS AND OUTPUTTING OPERATING INSTRUCTIONS IN MOTOR VEHICLES

FIELD OF THE INVENTION

The present invention relates to a method and device for event interpretation and output of operating instructions in motor vehicles.

Although applicable to any desired information systems for event interpretation and output of proposed responses, the present invention and the object on which it is based are explained here with respect to an on-board information system in an automobile.

BACKGROUND INFORMATION

Automotive information systems today essentially use individual signal paths, sensor signals being relayed from a vehicle-relevant area to a warning lamp via a signal, analyzer logic unit, the warning lamp being provided specifically for this area. Acoustic signals are also used as warnings. This may be more or less satisfactory, depending on the defect and/or technical problem that has occurred in the vehicle. Such a warning is fully adequate in a case when a warning buzzer is activated on the driver's door being opened when the engine is turned off and the headlight is on, because the underlying technical problem is very simple, namely that the battery of the vehicle will be used up rapidly during a lengthy parking with the headlight turned on and there would be no serious consequences.

Several events coincide in situations which are more complex technically and concern events relevant to driving safety, involving measurement signals from multiple sensors, e.g., when driving in mountains when the tire air pressure is too low, the outside temperature is very low and the coolant water temperature is high combined with a low coolant water level at the same time, making it difficult for the driver to draw a reasonable conclusion from the different warning signals presented to him. In other words, there is no more comprehensive information regarding the gravity and more far-reaching consequences of the problem that has occurred or the plurality of problems occurring simultaneously. The driver may obtain information in the operating manual regarding the significance of the error signal when a certain warning light comes on, but in practically all cases the driver is instructed by the manual to take the vehicle to the nearest repair shop more or less immediately to have the problem analyzed and corrected by an expert. The disadvantage to this procedure is that it is remote from the practical situation and under some circumstances may unnecessarily worry the driver or leave the driver in uncertainty.

One approach for an automotive warning system is described in German Engineering Society Reports No. 687, 1988, for example. However, this system is limited to output of warning instructions to the driver based on very simple events from a technical standpoint, such as falling below the value set for the minimum tank level. The system disclosed there does not make any proposal for how the driver is to be informed and/or warned in a manner that is satisfactory for the driver in more complex situations.

SUMMARY OF THE INVENTION

The method according to the present invention and the corresponding device have the advantage over the known approaches that the driver is informed comprehensively and reliably regarding problems that have occurred even in the case of complex technical problems. In an advantageous manner, this information includes an explanation of the consequences of a problem as well as a proposal for the simplest way to correct the problem. The inventive concept therefore increases the driver's level of information, permits an understanding when problems occur and also does not distract the driver much from the traffic situation. In addition, the method proposed according to the present invention is open for the driver to make inquiries on his own to obtain information regarding the operation, maintenance and care of the vehicle. According to the present invention, such inquiries are made in an optimized form by audio or visual display or text output to the driver. The central point of the inventive concept is utilization of an electronic database containing the technical information including the error codes of devices of the automotive sensor system and the automotive electronic system for analyzing event information, informing the driver comprehensively and understandably regarding the problems that have occurred. Likewise, the database may be the target of an inquiry initiated by the driver.

The idea on which the present invention is based is to bundle the multitude of items of error and/or defect information obtained from the multitude of sensors and the complexity of modern motor vehicles, optionally linking it to experience gained empirically, and outputting operating instructions to the driver that do not go beyond his technical abilities, but instead are adapted to the given situation. This may be very important, e.g., when driving at high speeds.

The inventive system responds in a preferred manner to the following events: system-diagnosed errors in the automotive electronic or sensor systems, i.e., when an existing, system component belonging to the inventive concept, e.g., a program which functions as a system monitor, inquires about and detects error codes of sensors and control devices.

In addition, an event may be defined by certain critical threshold values of vehicle-relevant measured quantities being reached or exceeded or by the occurrence of predetermined signal patterns and/or error codes from the devices of the vehicle electronic and/or sensor systems. In this case, error states occurring simultaneously in particular are detected systematically as a certain combination. Since such combinations always occur with a certain statistical frequency, information obtained empirically can be output to the driver as operating instructions.

Inquiries by the driver/passenger may also define an event. For example, the driver would like to know whether certain maintenance work may be expected within an interval of time or kilometers selected by the driver. The inventive method is able to process this inquiry and, after making inquires with the technically relevant sensors, then construct an answer. Such an answer may be formulated by using linguistic variables in a particularly preferred manner. A linguistic variable may describe, for example, the technical state of a certain electronic device or a mechanical device. For example, the thickness of a brake pad of a brake disk or the like may be quantified by using four values for the linguistic variable, for example: "completely adequate," "adequate," "barely acceptable," "defective." Such linguistic variables may of course be adapted to the importance of the system components evaluated for the overall safety of the vehicle.

According to a preferred refinement, events such as those described last above are processed. Therefore, the inventive method is very universally usable for the driver.

According to another preferred refinement, other sensors or devices may be actively queried by the system without initiation by the driver on occurrence of predetermined error code combinations and/or event combinations. This makes it possible to differentiate technical problem situations more specifically and to relieve the driver of an additional mental effort while driving.

According to another preferred refinement, most of the operating instructions are output to the driver via an audio output unit. This has the advantage that the driver may keep his sight on the road and he is not required to read a running display while driving in a negligent manner.

According to another preferred refinement, the inventive method may use input and/or output devices already present in the vehicle by having the system provide appropriate interfaces to the devices. Thus, for example, the keypad of the car radio may be used as an input unit, the microphone of a car telephone or cell phone may be used as the audio input unit, and the radio loudspeaker may be used as the audio output unit or the display of the radio used as a visual output unit. Additional combinations with input and output devices already present on board the vehicle are also conceivable.

According to another preferred refinement, the inventive system for event interpretation and output of operating instructions in motor vehicles has an interface for wireless connection to a remote database to obtain information regarding error codes and/or error code combinations. In this embodiment, the database is not on board the vehicle itself but instead is situated at one or more geographically dispersed points, and the information is called up from the database to the extent needed.

According to another preferred refinement of the inventive system, the database may also be located on board the vehicle itself. The implementation of the database is expediently adapted to the available computer resources. If these resources are adequate, a relational database may be implemented in an on-board PC. However, then particularly critical state parameters of a vehicle may expediently be monitored redundantly in the interest of increased safety against failures, and the corresponding warnings may also be delivered redundantly to the driver. Coupling of this system to a database in a notebook is also feasible. Bluetooth might be used as the transmission standard, for example.

BRIEF DESCRIPTION OF THE DRAWINGS

FIG. 2 shows a table of the information stored for certain error codes for output to the driver.

FIG. 3 shows a table of an exemplary implementation of a catalog of regulation measures which includes the consequence of one or more specific events as well as a recommendation to the driver.

DETAILED DESCRIPTION

Figure 1:
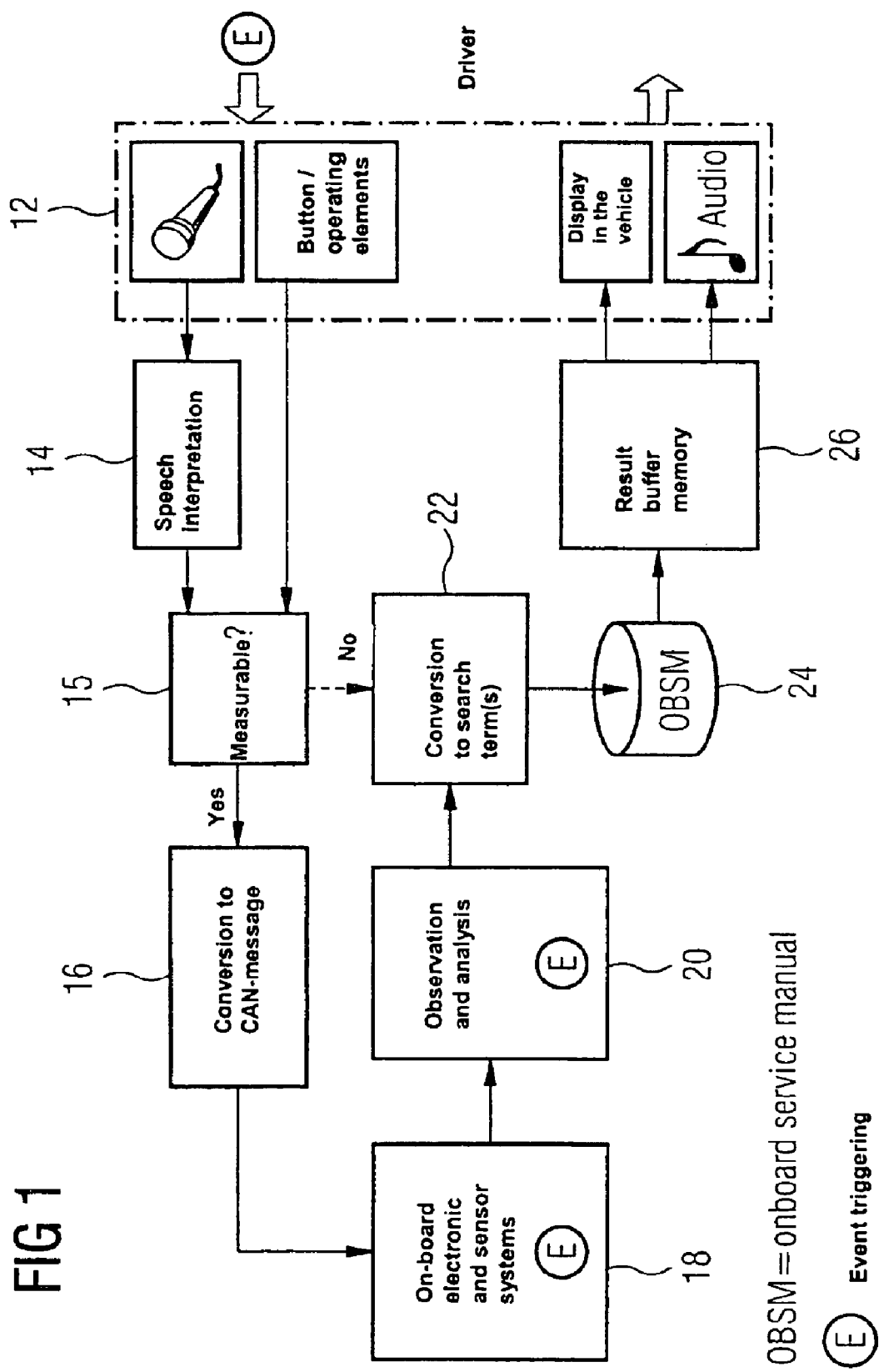
FIG. 1 shows a schematic block diagram illustrating the system elements for the inventive method as well as the functional sequence during the inventive method.

FIG. 1 shows a schematic block diagram illustrating the system elements for the inventive method as well as the functional sequence during the inventive method.

The system proposed according to the present invention is referred below as an on-board service assistant (OSA). In the preferred embodiment illustrated in FIG. 1, an input/output unit 12 is provided, a number of keys and operating elements functioning as the input unit and a microphone being provided. In addition, input/output unit 12 has a pixel-oriented display as well as loudspeakers for speech output.

Audio signals spoken by the driver and input into the system are converted in a module 14 for speech interpretation into certain key words which are subjected to analysis by the system.

The module for speech interpretation 14 contains in a preferred manner a speech recognition software, optionally in combination with suitable hardware such as DSP and it converts the driver's inquiry into search terms recognizable by the system. In a preferred manner, speech interpretation module 14 may be designed to be interactive, calling up certain terms input by the driver and giving the driver, for selection, terms stored in the database for one or more of the terms input. This method of user guidance would then be analogous to conventional online help systems and dialogues.

When a certain inquiry concerns a measurable quantity, this inquiry is processed in a logic unit, branching off into a yes branch and a no branch, a certain measured quantity of on-board electronic and sensor systems 18 sought by the driver in the yes branch being converted in a CAN message conversion logic unit 16 into a CAN bus query.

The sought measured value of on-board electronic and sensor system 18 is read out over the CAN bus and the measured value is submitted to another system component, system monitor 20, for analysis. System monitor 20 recognizes that critical threshold values have been exceeded and recognizes the occurrence of unusual signal patterns, and is capable of querying the control devices regarding error codes.

System monitor 20 may be implemented as an independent hardware unit or as additional software in an existing control device or an on-board PC already present. All decision-making logic units are programmed therein. System monitor 20 is also connected to a module 22 for conversion of the measurement result into a search term suitable for a database 24. One or more table entries which are associated with an error code of a certain sensor queried may be searched in the database and all relevant information from the database may be kept available for the driver in an event buffer memory 26 for optical playback and/or preferably acoustic playback to the driver until the driver confirms output of the respective event interpretation by an acknowledgment action such as depressing a key.

Database 24 may be interpreted as an operator's manual or on-board service manual (OBSM) provided on board in the vehicle, containing additional information for certain error codes.

The function steps during operation of the OSA are described in greater detail below.

The on-board service assistant (OSA) responds to the above-mentioned events such as errors in the on-board electronic system and other detectable problems such as an increased engine temperature, motor oil too low, etc. and responds to inquiries by the driver.

If an event occurs, the information assigned to the event is localized in the OBSM and the information to be output to the driver is selected. In an advantageous manner, a display delay may also be stored in the database with any desired error code. Such a display delay prevents distraction of the driver on occurrence of noncritical events while driving. Thus the event associated with a certain error code which has occurred may be read out of the database into buffer memory 26 and output to the driver at a later suitable time, independently of the actual occurrence of the error.

This uncoupling in time is represented in FIG. 1 by the broken line frame around input/output unit 12.

Such a time delay may be implemented by conventional measures such as a database trigger, for example.

The output text provided for the driver may be generated synthetically in a preferred manner from the text data contained in database 24 and stored additionally in event buffer memory 26 or exclusively as audio information. In a preferred manner, the event buffer memory is erased only when the driver has confirmed output of the information or when the memory is needed for other purposes. In addition, the event buffer memory may also be designed to be of a size such that it is capable of storing information on multiple events.

FIG. 2 shows a table of information stored for a certain error code for output to the driver.

FIG. 2 shows excerpts of the information from the vehicle operating instructions for an error code 0480 and an error code of 4711, including certain specifications in electronic form and also interpretations of significant events which are registered in the observation and analysis module, which was referred to above as system monitor 20. It should be pointed out here that the table structure illustrated in FIG. 2 need not necessarily reflect the structure of OBSM database 24 itself. In addition, it should be pointed out that no separate audio file need be stored for each error code entry in order to reduce demand on memory, because speech output may also be generated synthetically from text, as mentioned above.

In the example shown for error code 0480, a cooling fan 1 has a malfunction, as shown in columns 2 and 3. Columns 4 and 5 store the fact that corresponding information for the driver may be output as audio information and as visual information. Column 6 stores as text information the fact that there is the risk of engine overload. In column 7, the defect of failure of cooling fan 1 is classified as serious. Column 8 stores the text of a recommendation which may be output as operating instructions to the driver. Finally, column 9 stores information as to whether the message is to be output with or without a display delay. In this case, the error text, the type of error, the consequence, the classification and the recommendation should be output immediately as audio information as well as a visual display.

In the description of the error and/or defect shown as error code 4711, the defect does not need to be displayed until the next start because it is only a mild defect. The remaining table fields have been left empty to simplify understanding.

With a supplementary reference to FIG. 1, individual preferred features of the inventive method and the inventive device are described below with respect to the various events that may be processed.

The inventive system is able to diagnose errors itself by cyclically querying observation and analysis module 20, which was also referred to above as the system monitor, or when certain other events occur, querying all or only certain control devices or sensors. If a continuous error code occurs, the information stored regarding this error in database 24 (OBSM) is compiled and stored in event buffer memory 26 until being output to the driver, i.e., almost immediately or only when the engine is shut down or the next time the engine is started. The driver is informed regarding the type of problem that has occurred, its relevance or severity, and a strategy for correcting the problem is proposed. If it is possible to transmit problems diagnosed in the vehicle to a central service office by mobile wireless or the like, the driver is also informed regarding optional measures to initiate. For example, an output such as the following might be generated: "Please go to repair shop X in city Y, street Z, which has already been notified and will repair your car."

With supplementary reference to FIG. 3, the handling of problems not detected by error codes is described below. FIG. 3 shows a table illustrating an exemplary implementation of a catalog of regulation measures which includes the consequence of one or more certain events as well as a recommendation to the driver.

A preprogrammed catalog of regulation measures stored in database 24 OBSM includes critical values and critical value combinations on which certain events may be based, and recommendations for the driver. This is schematically illustrated in FIG. 3 for two event combinations. When an event is registered or an event combination is recognized as such, one or more conditions of the catalog of regulation measures are met. Then the information assigned to the event is output to the driver. In a preferred manner, the outputs to the driver may be sorted according to importance and duplicate instructions may be omitted.

The values of sensor signals in the motor vehicle are monitored periodically by observation and analysis module 20. This may preferably be done as follows by periodically analyzing the stored catalog of regulation measures, where the analysis or catalog of regulation measures contains critical values of sensor signals and combinations of such sensor signals.

The event combination of the first line is perceived when the coolant temperature is more than 110 degrees and the coolant level is too low. Then there is the risk of engine overheating and the recommendation to stop at the next opportunity and fill up with coolant is output to the driver.

The second example is a combination of four events: first, the coolant temperature is below 40 degrees and in addition the instantaneous engine rpm is above 7000 rpm; furthermore, the engine load is assigned the linguistic variable "high" and the observation time is longer than two seconds, i.e., the engine condition defined by the three above mentioned events has lasted already for more than two seconds. Then there is the risk of shortening the engine lifetime. Then a recommendation is output to the driver that he should reduce the vehicle speed and engine load immediately.

It should be pointed out that the numbers of values for certain linguistic variables depend on the resolution of the respective sensors. In some cases, it is a binary decision, namely if a critical value has been reached or not, for example, whereas in other cases the values belonging to a variable may be split more finely. The use of linguistic variables simplifies the implementation of the catalog of regulation measures.

It should be pointed out here that the system function described here goes far beyond diagnosis on a pure component level in the control device. Any desired rules may be formulated in the event column of FIG. 3 and any desired signal patterns may be stored, representing a large selection of empirical knowledge, which may even be specific for certain types of vehicles.

The control flow of the inventive method in the case of inquiries by the driver is described below.

When the driver makes an inquiry to the system, this may be done through selecting menu points on a display or also by speech inquiry. In the latter case, the on-board service assistant is put in readiness by actuation of an operating element such as a button. With the help of speech recognition software in module 14 (FIG. 1) search terms are generated from the inquiry such as "engine oil level," "transmission oil," etc. and the inquiry itself may be as follows: "Tell me what the transmission oil level and engine oil level are."

In an advantageous manner, the information thus sought may then be obtained through a hierarchically branched search term thesaurus.

With additional reference to FIG. 1, then in the next step, a decision is made as to whether the information requested by the driver is a measurable quantity such as the supply of coolant or the engine oil level. To this end, a list containing measurable search terms and the respective CAN messages is stored. If it is a measurable quantity, then the corresponding quantity is called up from the on-board electronic system, i.e., the corresponding bytes of a CAN message containing the measured value are read out. If there is no matching event in database 24, the driver is given the information that the measured value is within the normal range; e.g., "tire pressure is okay," if a suitable tire pressure sensor is present on the vehicle. Then additional information on the search term stored in the database may also be output, e.g., "under a normal load, a tire pressure of 2.5 bar should be maintained for front and rear wheels."

However, if the signals reported by the on-board sensor systems indicate unusual states which might pose a threat to driving safety, a corresponding message should already be present in event buffer memory 26. Because of the display delay described above with respect to FIG. 2, this message may not yet have been output. In this case, the content of event buffer memory 26 is output without delay with regard to the variable queried.

If the driver's inquiry is not based on a measurable value, as in the case of the key word "wheel change", then the information stored in OBSM database 24 in this regard is output directly. Optionally by analogy with the output delay in the case of error messages, it may be noted for each search term in the database whether or not output during driving operation is to be allowed. For example, it would not be appropriate to display a graphic for changing the tire while driving the vehicle inasmuch as it could distract the driver.

Although the present invention has been described above on the basis of a preferred exemplary embodiment, it is not limited to this embodiment but instead may be modified in a variety of ways.

For example, the inventive method could also be expanded in such a manner that database 24 in an expanded form also stores first aid information for use in the event of an accident. Thus in a simple case, rules for behavior with regard to the next steps to be taken in an accident situation could be described, or in a more complex embodiment even more detailed information regarding first aid for accident victims including graphic illustrations could be displayed. The driver could then retrieve this information by inputting search terms.

The system described here may be used as an integral component of a driver information system or an on-board PC or a car radio and navigation systems, depending on the computing power and storage capacity made available by such systems. The on-board service manual stored in database 24 may also be stored on a portable memory card such as a multimedia card. Such a memory card could be provided as a plug-in card in notebooks, driver information systems, car radios, and the like.

What is claimed is:

1. A method of performing an event interpretation and outputting an operating instruction in a motor vehicle system, comprising:
    compiling event information with respect to a vehicle-relevant event from devices of the vehicle electronic system and vehicle sensor system;
    analyzing the event information by comparison with error codes of the devices stored in a database system and more extensive information regarding the error codes; and
    outputting the operating instruction to a driver as a function of the analyzed event information, wherein the operating instruction is a problem solving instruction for a driver action in response to the event information.

2. The method as recited in claim 1, wherein the vehicle-relevant event includes one of:
    a system-diagnosed error in the devices,
    one of reaching and exceeding a critical threshold value of a quantity measured by a sensor,
    an occurrence of a predefined signal pattern emanating from the devices, and
    an inquiry by the driver.

3. The method as recited in claim 1, further comprising:
    analyzing the event information by comparison with predefined information regarding an error code combination.

4. The method as recited in claim 1, further comprising:
    querying a signal of an additional device in order to perform an error diagnosis whenever at least one of a predetermined error code combination and a predetermined event combination occur.

5. The method as recited in claim 1, further comprising:
    outputting the operating instruction to the driver acoustically via an audio output unit.

6. The method as recited in claim 1, further comprising:
    operating an input/output device present in the vehicle for at least one of:
        inputting at least one of a message and an inquiry, and
        outputting the operating instruction to the driver.

7. A device, comprising:
    a system monitor for compiling event information with respect to a vehicle-relevant event from devices of the vehicle electronic system and vehicle sensor system and for analyzing the event information by comparison with information stored in a database system regarding error codes of the devices; and
    an interface for an output of an operating instruction to a driver as a function of the analyzed event information, wherein the operating instruction is a problem solving instruction for driver action in response to the event information.

8. The device as recited in claim 7, further comprising:
    an input device for input of at least one of a message and an inquiry by the driver.

9. The device as recited in claim 7, further comprising:
    an additional interface for a wireless connection to a remote database for retrieving information regarding at least one of the error codes and error code combinations.

10. The device as recited in claim 7, further comprising:
    a database for retrieving information regarding at least one of the error codes and error code combinations.

11. A memory card for connection to a device, comprising:
    a database for storing one of error codes and error code combinations together with respective operating instructions, at least one of the error codes and the error code combinations being based on devices of at least one of a vehicle electronic system and a vehicle sensor system, and the operating instructions being outputtable to a driver.

* * * * *